(12) United States Patent
Hobson

(10) Patent No.: US 7,951,353 B1
(45) Date of Patent: May 31, 2011

(54) FLOW CONTROL METHOD AND APPARATUS FOR A CONTINUOUS MULTIPLE ZONE MASS TRANSFER

(75) Inventor: David Alan Hobson, Wheaton, IL (US)

(73) Assignee: Merichem Company, Houston, TX (US)

( * ) Notice: Subject to any disclaimer, the term of this patent is extended or adjusted under 35 U.S.C. 154(b) by 0 days.

(21) Appl. No.: 12/794,875

(22) Filed: Jun. 7, 2010

(51) Int. Cl.
*B01D 53/77* (2006.01)
*B01D 53/78* (2006.01)
*C01B 17/05* (2006.01)

(52) U.S. Cl. ............... 423/573.1; 423/576.6; 423/576.8; 422/168; 422/169; 422/170

(58) Field of Classification Search ............... 423/573.1, 423/576.6, 576.8; 422/168, 169, 170
See application file for complete search history.

(56) References Cited

U.S. PATENT DOCUMENTS

| 4,238,462 A | 12/1980 | Hardison | |
|---|---|---|---|
| 5,160,714 A | 11/1992 | Hardison | |
| 5,422,086 A * | 6/1995 | Bowman | 423/220 |

* cited by examiner

*Primary Examiner* — Timothy C Vanoy
(74) *Attorney, Agent, or Firm* — McDonnell Boehnen Hulbert & Berghoff LLP

(57) ABSTRACT

An apparatus and method of contacting a liquid with different gases sequentially in separate mass transfer zones within a single vessel, the mass transfer zones operatively in fluid communication with each other, including intimately contacting the liquid with a process gas in co-current flow in a downstream mass transfer zone to effect mass transfer between the liquid and the process gas, and introducing the liquid into an upstream mass transfer zone with a second gas, different from the process gas, thereby effecting mass transfer between the liquid and the second gas. The rate of flow of the liquid from the upstream mass transfer zone to downstream mass transfer zone is controlled by the controlled addition of a third gas into one or more downcomers separating each mass transfer zone such that the specific density of the liquid in the downcomers provides a driving force that controls flow.

15 Claims, 2 Drawing Sheets

FLOW CONTROL METHOD AND APPARATUS FOR A CONTINUOUS MULTIPLE ZONE MASS TRANSFER

FIELD OF THE INVENTION

The present invention is directed to a method and apparatus for contacting a liquid with a plurality of different gases, sequentially, in a gas-liquid contact apparatus having a plurality of gas-liquid contact zones, each in fluid communication with at least one other gas-liquid contact zone within a single vessel for mass transfer between the gases and the liquid, in such a manner that solution circulation is created by density differences ever between gas-liquid contact zones and intermediate liquid-filled downcomers, without the use of a solution circulation pump. More particularly, the present invention is directed to a method and apparatus for continuously removing hydrogen sulfide gas ($H_2S$) from a fluid stream by reacting the fluid stream with a catalytic redox polyvalent metal solution for $H_2S$ gas removal, and continuously regenerating the catalytic solution by reaction with an oxygen-containing gas. The process is particularly suited to treating process gas streams having a relatively high $H_2S$ concentration, e.g., at least 1% by volume, at a relatively low pressure, e.g., less than 1 bar gage, but is useful for process gas streams at any pressure.

BACKGROUND OF THE INVENTION AND PRIOR ART

The method and apparatus of the present invention are improvements over the autocirculation method and apparatus disclosed in prior U.S. Pat. Nos. 4,238,462 and 5,160,714 and is useful for gas-liquid mass transfer where a liquid is contacted with two different gases in separate contact zones. The series of reactions involved in catalytically oxidizing sulfur contaminants, such as hydrogen sulfide, to elemental sulfur using an iron chelate catalyst can be represented by the following reactions, where L generically represents the two or more particular ligands chosen to formulate the metal chelate catalyst admixture:

$$H_2S_{(gas)}+H_2O_{(liq.)} \rightarrow H_2S_{(aqueous)}+H_2O_{(liq.)} \quad (1)$$

$$H_2S_{(aqueous)} \rightarrow H^+ + HS^- \quad (2)$$

$$HS^- + 2(Fe^{3+}L_2) \rightarrow S_{(solid)} + 2(Fe^{2+}L_2) + H^+ \quad (3)$$

By combining equations (1) through (3) the resulting equation is:

$$H_2S_{(gas)}+2(Fe^{3+}L_2) \rightarrow 2H^+ + 2(Fe^{2+}L_2) + S_{(solid)} \quad (4)$$

In order to have an economical workable process for removing hydrogen sulfide from a gaseous stream when a polyvalent metal chelate admixture is used to effect catalytic oxidation of the hydrogen sulfide, it is essential that the ferrous iron chelate formed, as exemplified above, be continuously regenerated by oxidizing to ferric iron chelate on contacting the reaction solution with dissolved oxygen, preferably in the form of ambient air, in the same or in a separate contact zone. The series of reactions which take place in the oxidizer of my invention when regenerating the metal chelate catalyst can be represented by the following equations:

$$O_{2(gas)} + 2H_2O \rightarrow O_{2(aqueous)} + 2H_2O \quad (5)$$

$$O_{2(aqueous)} + 2H_2O + 4(Fe^{2+}L_2) \rightarrow 4(OH^-) + 4(Fe^{3+}L_2) \quad (6)$$

By combining equations (5) through (6), the resulting equation (7) is:

$$\tfrac{1}{2}O_2 + H_2O + 2(Fe^{2+}L_2) \rightarrow 2(OH^-) + 2(Fe^{3+}L_2) \quad (7)$$

And, when equations (4) and (7) are combined, the overall process can be represented by the following equation:

$$H_2S_{(gas)} + \tfrac{1}{2}O_{2(gas)} \rightarrow S_{(solid)} + H_2O_{(liq.)} \quad (8)$$

It will be evident from the foregoing equations that theoretically two moles of ferric iron must be supplied to the reaction zone in which the hydrogen sulfide gas is oxidized to form elemental sulfur for each mole of hydrogen sulfide gas treated, and in actual practice considerably more than the theoretical amount of iron is used. In a continuous process of removing hydrogen sulfide by contact with a catalytic ferric iron solution, the catalytic solution is circulated continuously between an absorber zone, where the $H_2S$ is absorbed by the catalytic ferric iron chelate solution, and the solution is reduced to ferrous iron and an oxidizer zone is used to oxidize the reduced ferrous iron back to the ferric iron state. In order to avoid using high concentrations of iron in the catalytic solution, the rate of circulation should be high.

The method and apparatus described in earlier autocirculation references has been commercially successful, but the commercial use of that method and apparatus suffers from several disadvantages including some lack of control of residence time for gas-liquid contact in each of the reaction zones and poor liquid flow control. U.S. Pat. No. 5,160,714 provides a method of contacting a liquid with different gases sequentially in separated mass transfer zones within a single vessel whereby the rate of liquid flow from one mass transfer zone to another is motivated by the difference in the aerated liquid density in a mass transfer zone and the non-aerated liquid density in a preceding liquid downcomer. This density difference acts as a "pump" to create a driving force. In this patent, it was contemplated that liquid flow rate would be controlled by adjusting the gas rate to one or more mass transfer zones only; however, this did not prove to be practical since the gas rates to the various mass transfer zones are generally governed by process requirements other than liquid flow rate. The amount and composition of sour gas entering the apparatus is always controlled by upstream processes and is thus independent of the operation of the apparatus. The operation of the apparatus must be able to adjust to the inlet sour gas condition. The amount of air injected into the oxidization zone is dependent on the amount of $H_2S$ contained in the sour gas, and the liquid circulation rate must, at a minimum, supply sufficient moles of iron to satisfy equation 3 in the reaction zone. If left uncontrolled, the actual solution circulation rate will be determined by the physical characteristics of the apparatus, and the aerated densities of the reaction zone and the oxidizer zone. If the solution circulation rate is too high, oxygen can be transferred from the oxidization zone into the reaction zone resulting in the production of unwanted byproducts, such as sulfates. If the solution circulation rate is too slow, insufficient iron will be supplied to the reaction zone to satisfy reaction 3, resulting in the formation and precipitation of iron sulfide.

To compensate for this lack of control, various items such as butterfly valves, flow restricting wedges and slide gates were installed in the liquid conduit line that recycled the spent reagent from the absorber to the oxidizer. Unfortunately, all of the proposed solutions to control liquid flow through the mass transfer zones proved to be impractical due to plugging caused by solids (i.e., elemental sulfur) entrained in the liquid.

My invention addresses the needs of those in the art and in particular provides an apparatus and process steps that alleviate all of the problems and difficulties of previous flow control devices. These and other advantages will become evident from the following more detailed description of the invention.

SUMMARY OF THE INVENTION

My invention overcomes the disadvantages of the prior known processes by providing a continuous process for contacting a liquid reagent sequentially with a process gas and a second gas comprising the steps of introducing a process gas into a downstream mass transfer zone containing a liquid reagent, where the mass transfer zone is in fluid communication with a second downcomer. The process gas preferably contains $H_2S$ and the second gas preferably contains oxygen. Liquid reagent from the downstream mass transfer zone can optionally flow into a surge downcomer where it is removed and recycled to an upstream mass transfer zone that is in fluid communication with a first downcomer. The second gas is introduced into the upstream mass transfer zone at a first flow rate where it mixes with the liquid reagent before it flows into the first downcomer. A third gas is introduced into the first downcomer where it mixes with the liquid reagent flowing from the upstream mass transfer zone. The third gas can be, but is not required to be, the same gas as the second gas. The liquid reagent from the first downcomer is allowed to flow into an intermediate mass transfer zone that is in fluid communication with the second downcomer. The second gas can also be introduced into this intermediate mass transfer zone.

Varying the flow rate of the third gas introduced into the first downcomer controls the flow of the liquid reagent from the upstream mass transfer zone to the intermediate mass transfer zone. This is possible because the density of an aerated solution varies directly with the non-aerated density of the solution and inversely with the gas velocity through the solution, i.e., the higher the gas velocity the lower the aerated density. Therefore, the lower the density (or specific gravity) of the liquid in the first downcomer the slower the flow of liquid from the upstream mass transfer zone to the intermediate mass transfer zone. Adjusting the velocity of the third gas added to the first downcomer allows the flow of the liquid to be increased or decreased to achieve optimal sulfur removal. As previously described, the ideal solution circulation rate is that which supplies sufficient moles of ferric iron to oxidize the sulfide ions and at the same time to supply sufficient moles of oxygen to oxidize the ferrous ions. If the solution circulation rate is too high, sulfide ions can be transported into the oxidizer zone resulting in the formation of byproduct salts such as thiosulfate and sulfate. If the solution circulation rate is too low there will be insufficient ferric ions to oxidize the sulfide ions. In this case the iron will be overreduced resulting in the formation of iron sulfide, which is extremely detrimental to the process.

In a further embodiment of my invention, a flow of the second gas can also be introduced into the liquid reagent in the intermediate mass transfer zone and a flow of the third gas can be introduced into the second downcomer to control the flow of liquid reagent from the intermediate mass transfer zone to the downstream mass transfer zone. Again, the second and third gases can be the same.

The flow rates of the second and third gases can be controlled and varied using controllers known to those in the art. The flowrate of the second gas, containing oxygen is generally not precisely controlled. The systems are generally designed with 2 or 3 "air blowers," and the air flow to the unit is controlled by turning a blower on or off. This is determined by analyzing the "REDOX" potential of the solution, which is a routine analytical procedure well-known to those skilled in the art. If the REDOX potential is too low, meaning that the iron ions are insufficiently oxidized, the flowrate of the oxygen containing gas may be increased. If the "REDOX" potential is too high, meaning that the solution is over-oxidized, the flowrate of the oxygen containing gas should be decreased. Another cause of a low REDOX potential is that insufficient oxidized iron ($Fe^{+++}$) is being supplied to the reaction zone to satisfy equation 3. If this occurs the iron content of the solution may be increased; however, this will result in higher operating costs due to the greater iron lost from the system associated with solution loss. Another method of satisfying the iron demand of the reaction zone is to increase the solution circulation rate by decreasing the flowrate of the third gas. This will increase the density difference between the reaction zone and/or the oxidization zone and the corresponding downcomer(s). Again the amount of adjustment is determined by the change in the REDOX potential of the solution. If the increase in solution circulation rate satisfies the iron demand of the reaction zone but also results in increase byproduct formation due to carryover of oxygen into the reaction zone, then the circulation rate should be decreased by increasing the flow of the third gas into the downcomer coupled with a corresponding increase in the iron content of the solution.

Each of the mass transfer zones or chambers may be divided into two or more separate contact stages for continued gas-liquid contact. The separate stages of each gas-liquid mass transfer zone are in sequential fluid communication, one with another through intermediate downcomers that are formed by an inverted weir extending downwardly from an upper portion of a downstream end of one stage and a submerged weir extending upwardly from an upstream end of the succeeding stage, the weirs being horizontally spaced and vertically overlapping within the liquid. In accordance with a preferred embodiment, at least one downcomer containing a gas sparger separates one gas-liquid mass transfer zone from another gas-liquid mass transfer zone to provide controlled residence time and controlled circulation of solution between the two mass transfer zones, preferably for sequential contact with a different gas in each zone. In a preferred arrangement the upstream mass transfer zone is the first zone, the intermediate mass transfer zone is the second zone, and the downstream mass transfer zone is the third zone. However, it is within the scope of my invention to have more than three mass transfer zones each separated by one or more downcomers.

In particular, my invention provides an autocirculation method and apparatus for continuously removing hydrogen sulfide ($H_2S$) gas from a process gas stream by intimate contact with a catalytic polyvalent metal redox solution in one mass transfer zone and continuously regenerating the catalytic solution within the same vessel by intimate contact with an oxidizing gas in a separate mass transfer zone. In such a liquid redox processes for the oxidation of $H_2S$ to sulfur and water, contacting the liquid reagent with the second gas causes an oxidation reaction to occur forming elemental sulfur. Specifically, in a preferred embodiment, the process gas includes hydrogen sulfide gas and the liquid reagent is an oxidation-reduction solution, thereby effecting oxidation of the hydrogen sulfide gas and reduction of the oxidation-reduction solution forming a reduced oxidation-reduction solution in the third mass transfer zone and elemental sulfur. The second gas is capable of oxidizing the reduced solution to form an oxidized solution in the first and second mass transfer zones so that the oxidized solution is capable of further absorption of the process gas in the third mass transfer zone.

To perform the process of my invention an apparatus for a continuous contacting of a liquid reagent sequentially with a process gas and a second gas is described, comprising a first mass transfer zone in fluid connection with a first downcomer and a second mass transfer zone in fluid communication with the first downcomer and a second downcomer. A third mass transfer zone is in fluid communication with the second downcomer and is downstream of the first and second mass transfer zones. This is where the process gas is introduced. A surge downcomer can be downstream of the third mass transfer zone and a liquid reagent recycle conduit connecting the surge downcomer with the first mass transfer zone can be used to recycle spent liquid reagent to the mass transfer zone for regeneration. Individual gas spargers can be provided in each mass transfer zone, but must be included in at least one downcomer. Alternatively, a gas sparger can be provided in the other downcomers to control the flow of liquid between the other mass transfer zones. Any type of mechanical or electrical controllers can be used to vary the flow rates of the gases fed to the spargers in the mass transfer zones and downcomers. Likewise, any gas sparger design known to the art can be used to inject gas into the liquid filled downcomer.

The invention thus far has been described with particular emphasis on the use of iron as the polyvalent metal of choice; however, other polyvalent metals that form chelates with the ligands described above can also be used. Such additional polyvalent metals include copper, cobalt, vanadium, manganese, platinum, tungsten, nickel, mercury, tin and lead. The chelating agents are generally of the aminopolycarboxylic acid family such as EDTA, HEDTA, MGDA and NTA, or others any one of which can be used in connection with this invention.

These and other embodiments will become more apparent from the detail description of the preferred embodiment contained below.

BRIEF DESCRIPTION OF THE DRAWINGS

The above and other aspects and advantages of the present invention will become more apparent from the following detailed description of the invention, taken in conjunction with the drawings, wherein.

DETAILED DESCRIPTION OF THE PREFERRED EMBODIMENTS

Figure 1:
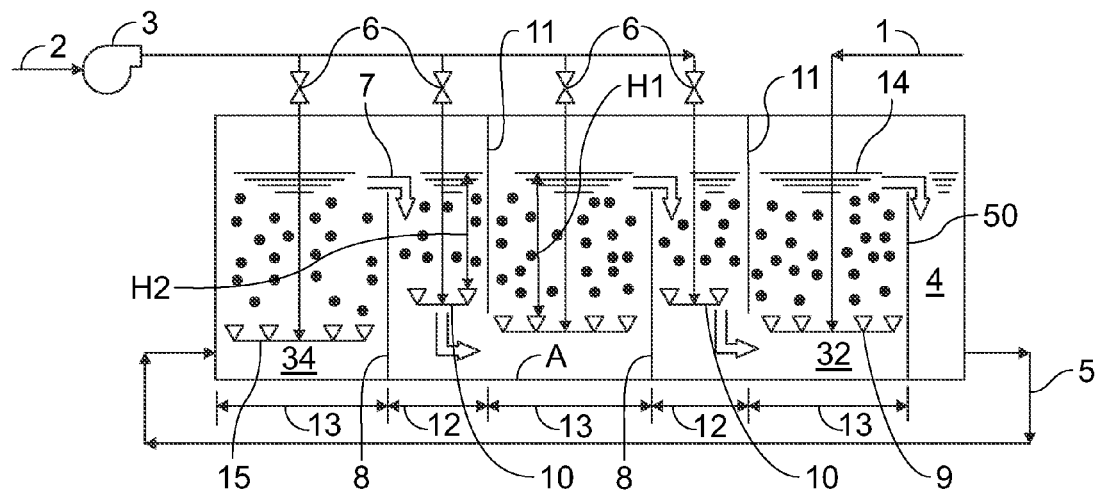
FIG. 1 is a side view of one embodiment of the gas-liquid mass transfer oxidizer/absorber vessel of the present invention.

Turning now to the drawings, and initially to FIG. 1, one embodiment of my invention is illustrated showing a gas sparger 10 inserted into one or more of the downcomers 12 connecting two mass transfer zones 13. The sparger(s) 10 are located above the bottom of the inverted weir(s) 11. Gas is then injected into the sparger(s) 10. As the amount of injected gas increases, the aerated density of the liquid in the downcomer(s) 12 will approach that of the aerated density in the mass transfer zones 13. The sparger(s) 10 can be inserted into the downcomers 12 separating two or more oxidization mass transfer zones and/or two or more process gas mass transfer zones. An explanation of how the device controls solution flow follows.

Figure 3:
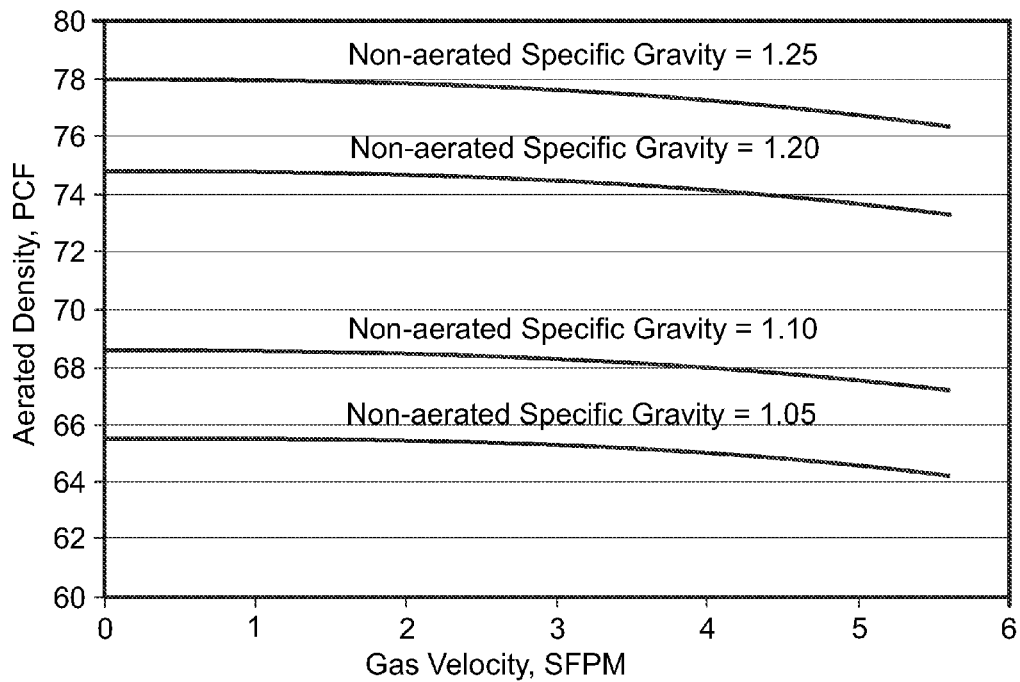
FIG. 3 is a graph showing the relationship of aerated density versus gas velocity for 4 non-aerated solutions of having different specific gravities.

As mentioned, the density of an aerated solution varies directly with the non-aerated density of the solution and inversely with the gas velocity through the solution. In other words, the higher the gas velocity the lower the aerated density and the lower the driving force, thus lower flow rates. This relationship is illustrated in FIG. 3 for an aqueous solution containing various amounts of inorganic salts, which varies the specific gravity of the solution.

A pressure balance around point A in FIG. 1 results in the following:

$$(\rho_d)(H2)+(\rho_{na})(H1-H2)-(F_d)=(\rho_{tz})(H1)-(F_{tz})$$

Or $$(F_d-F_{tz})=(\rho_d)(H2)+\rho_{na}(H1-H2)-(\rho_{tz})(H1)$$

Figure 4:
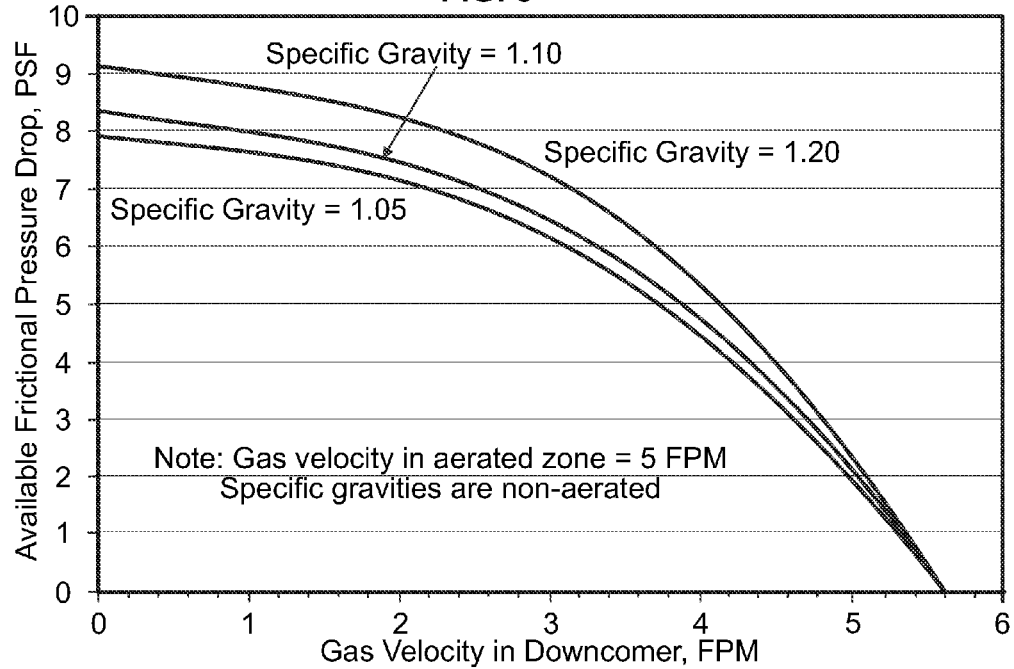
FIG. 4 is a graph of showing the relationship of available frictional pressure drop versus gas velocity in the downcomer.

Where:
$\rho_d$=Solution density in the downcomer, pounds/cubic foot
$\rho_{na}$=Non-aerated solution density, pounds/cubic foot
$\rho_{tz}$=Solution density in the mass transfer zone, pounds/cubic foot
H1=Solution height above the spargers in the mass transfer zone, feet
H2=Solution height above the spargers in the downcomer, feet
$F_d$=Frictional pressure drop in the downcomer due to solution flow, pounds/square foot
$F_{tz}$=Frictional pressure drop in the mass transfer zone due to solution flow, pounds/square foot The term $(F_d-F_{tz})$ is the difference in frictional pressure drop created by the flow of solution through the downcomer and the mass transfer zone. It is related to the difference of the squares of the two solution velocities. For example, assuming a solution velocity of 5 feet per minute in the mass transfer zone, and solution heights of 8 feet for H1 and 6 feet for H2, the effect of increasing the gas velocity in the downcomer is illustrated in FIG. 4. As the available frictional pressure drop increases, the solution flow rate through the downcomer required to pressure balance the system increases. Conversely, as more gas is injected into the downcomer sparger the available frictional pressure drop or driving force decreases resulting in less solution flow.

When the apparatus of FIG. 1 is used for a sulfur removal process, the absorber chamber 32 is connected in fluid communication through a surge downcomer 4 to the first mass transfer zone 13 of the oxidizer 34 via conduit 5. Circulation is driven by the liquid density differences induced by aeration, as described above, specifically by controlling the flow of gas to one or more spargers 10 located in one or more downcomers 12 by control valves 6. $H_2S$ rich gas is introduced through line 1 at the bottom of the absorber through sparger 9 in the absorber chamber 32 for intimate contact with liquid ferric iron chelate catalyst solution 14. The $H_2S$ rises along with oxidized catalyst solution from the third or last stage of the oxidizer zone to absorption zone, and after the oxidized catalyst solution has absorbed $H_2S$ from the process gas and converted it to sulfur in the absorption zone, the sulfur laden liquid catalyst solution flows over the baffle 50 separating the absorber chamber 32 from the surge downcomer 4, and flows through conduit 5 to the first oxidizer stage 34. In a preferred embodiment, a sloped plate (not shown) forms a floor of surge downcomer 4 to direct any settled sulfur to an outlet (not shown). Sulfur is ultimately removed from the system by filtration.

The $H_2S$ laden liquid catalyst in the first oxidizer stage is oxidized by an oxygen containing gas delivered through line 2 and pump 3 then flowing through sparger 15 and flows over baffle 8 and under baffle 11 to an intermediate oxidizer. The partially oxidized solution in the intermediate oxidizer is further oxidized by the oxygen containing gas flowing through a sparger and eventually flows into absorber 32. Spent oxidation gas is vented from the top of each oxidizer mass transfer zone through outlet conduits (not shown). All vented gases can be treated prior to release to the atmosphere.

Figure 2:
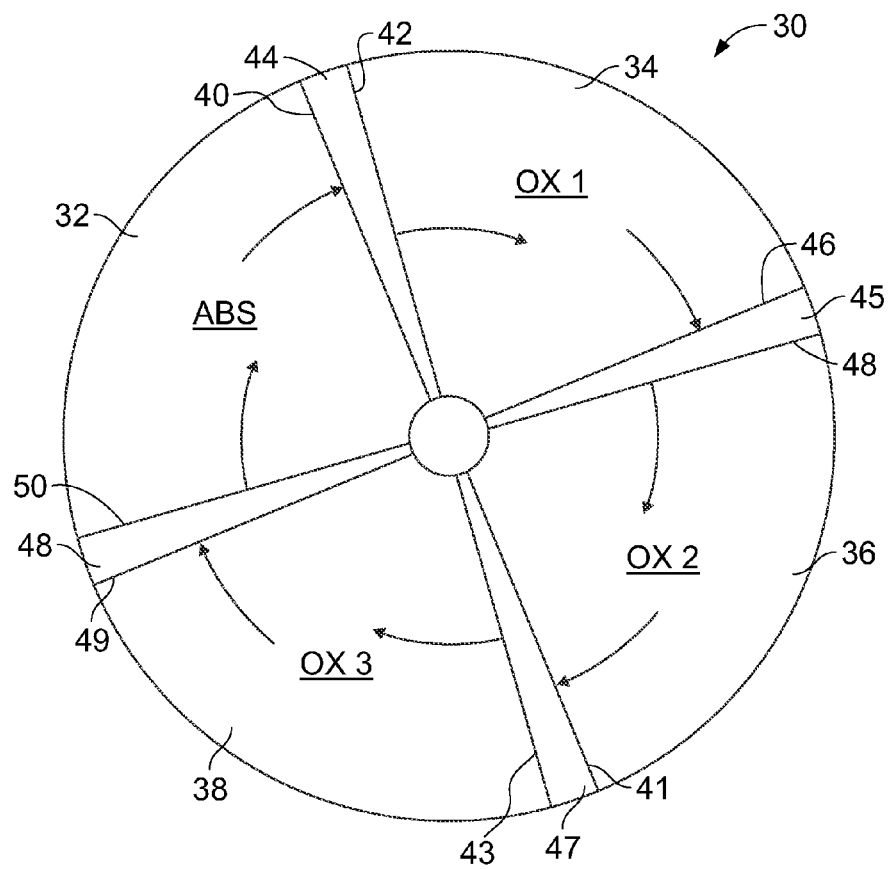
FIG. 2 is a top view of another embodiment of the gas-liquid mass transfer vessel of the present invention as a circular design.

The circular design of the process and apparatus shown in FIG. 2, generally designated 30, includes an absorber chamber 32 and an oxidizer chamber that is divided into three gas-separated stages, 34, 36 and 38. Horizontally and vertically spaced baffles or weirs 40 and 42, disposed between the absorber chamber 32 and the first oxidation stage 34 define a downcomer 44 there between, for holding the $H_2S$ laden polyvalent metal chelate solution prior to oxidation of the chelate solution. Similar downcomers are shown as 45, 47 and 48, each defined by horizontally and vertically spaced baffles such that 46 and 48 are disposed between the first and second oxidizer stages 34 and 36; horizontally and vertically spaced baffles 41 and 43 are disposed between the second and third oxidizer stages 36 and 38; and horizontally and vertically spaced baffles 49 and 50 are disposed between the third oxidizer stage 38 and the absorber chamber 32. The spaced baffles or weirs are constructed like those shown in FIG. 1 such that liquid from the absorber flows over baffle 40 and under baffle 42, and liquid from each successive oxidizer stage flows over its adjacent baffle 46, 41 and 49, and under the baffle 48, 43 or 50 adjacent the next succeeding zone. Although not shown in FIG. 2, gas spargers are disposed in oxidizer mass transfer zones, in the absorber mass transfer zone, and in one or more downcomers. Preferably, the cylindrical absorber/oxidizer vessel shown in FIG. 2 has a planar, horizontally disposed floor.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

I claim:

1. A continuous process for contacting a liquid reagent sequentially with a process gas and a second gas comprising the steps of,
   (a) introducing a process gas into a downstream mass transfer zone containing a liquid reagent, where the downstream mass transfer zone is in fluid communication with a second downcomer and a downstream downcomer;
   (b) removing liquid reagent from the downstream downcomer and circulating the removed liquid reagent to an upstream mass transfer zone that is in fluid communication with a first downcomer, where a first flow rate of a second gas is introduced into and mixes with the liquid reagent in the upstream mass transfer zone;
   (c) introducing at a second flow rate a third gas into the first downcomer where it mixes with the liquid reagent flowing from the upstream mass transfer zone; and
   (d) allowing the liquid reagent from the first downcomer to flow into a intermediate mass transfer zone that is in fluid communication with the second downcomer,
   wherein flow of the liquid reagent from the upstream mass transfer zone to the intermediate mass transfer zone is controlled by varying the second flow rate of the third gas introduced into the first downcomer.

2. The process of claim 1 where the second gas and the third gas are the same gas.

3. The process of claim 1 where a third flow rate is used to introduce the second gas into the liquid reagent in the intermediate mass transfer zone.

4. The process of claim 1 where a fourth flow rate is used to introduce the third gas into the liquid reagent in the second downcomer.

5. The process of claim 4 where flow of the liquid reagent from the intermediate mass transfer zone to the downstream mass transfer zone is controlled by varying the fourth flow rate of the third gas.

6. The process of claim 5 where the second gas and the third gas are the same gas.

7. The process of claim 1 where the first flow rate and the second flow rate are different.

8. The process of claim 6 where the third flow rate and fourth flow rate are different.

9. The process of claim 3 where the first flow rate and third flow rate of the second gas are different.

10. The process of claim 1 where contact of the liquid reagent with the second gas causes an oxidation reaction to occur.

11. The process of claim 1 where contact of the liquid reagent with the second gas causes an oxidation reaction to occur forming elemental sulfur.

12. The process of claim 1 wherein the process gas includes hydrogen sulfide gas and the liquid reagent is an oxidation-reduction solution, thereby effecting oxidation of the hydrogen sulfide gas and reduction of the oxidation-reduction solution and to form a reduced oxidation-reduction solution in the third mass transfer zone and to form elemental sulfur; and wherein the second gas is capable of oxidizing the reduced solution to form an oxidized solution in the first and second mass transfer zones so that the oxidized solution is capable of further absorption of the process gas in the third mass transfer zone.

13. An apparatus for a continuous process for contacting a liquid reagent sequentially with a process gas and a second gas comprising, in combination,
   (a) a first mass transfer zone in fluid connection with a first downcomer;
   (b) a second mass transfer zone in fluid communication with the first downcomer and a second downcomer;
   (c) a third mass transfer zone in fluid communication with the second downcomer; and
   (d) individual gas spargers in each mass transfer zone and in at least one of the first or second downcomers.

14. The apparatus of claim 13 further comprising controllers operatively connected to the gas spargers in at least the first or second downcomer.

15. The apparatus of claim 13 further comprising a liquid reagent recycle conduit connecting a surge downcomer in fluid communication with the third mass transfer zone to the first mass transfer zone.

* * * * *